United States Patent
Bradford et al.

(10) Patent No.: US 6,230,916 B1
(45) Date of Patent: May 15, 2001

(54) COLLAPSIBLE CONTAINER WITH INTEGRALLY SUPPORTED DUNNAGE

(75) Inventors: Judson A. Bradford, Holland; Robert M. Zink, Grand Haven, both of MI (US)

(73) Assignee: Bradford Company, Holland, MI (US)

(*) Notice: Subject to any disclaimer, the term of this patent is extended or adjusted under 35 U.S.C. 154(b) by 0 days.

(21) Appl. No.: 09/532,580

(22) Filed: Mar. 22, 2000

Related U.S. Application Data

(62) Division of application No. 09/033,680, filed on Mar. 3, 1998, now Pat. No. 6,062,410, which is a division of application No. 08/608,476, filed on Feb. 28, 1996, now Pat. No. 5,725,119.

(51) Int. Cl.[7] .................................................. B65D 81/00
(52) U.S. Cl. ............................................. 220/6; 206/583
(58) Field of Search .............................. 220/6, 532, 533, 220/544; 206/521, 521.7, 521.8, 521.9, 583

(56) References Cited

U.S. PATENT DOCUMENTS

| | | |
|---|---|---|
| 1,507,977 | 9/1924 | Schaefer . |
| 1,712,168 | 5/1929 | Rand, Jr. . |
| 1,768,467 | 6/1930 | Hutchings et al. . |
| 2,018,605 | 10/1935 | Craig . |
| 2,608,339 | 8/1952 | Benzon-Petersen . |
| 2,720,998 | 10/1955 | Potter . |
| 3,467,247 | 9/1969 | Weiss . |
| 3,940,018 | 2/1976 | Scholle . |
| 4,527,694 | 7/1985 | Bolt et al. . |
| 4,574,950 | 3/1986 | Koe et al. . |
| 4,685,571 | 8/1987 | Hoss . |
| 4,798,304 | 1/1989 | Rader . |
| 4,946,036 | 8/1990 | Kupersmit . |
| 5,211,290 | 5/1993 | Janus et al. . |
| 5,238,139 | 8/1993 | Bisceglia . |
| 5,437,384 | 8/1995 | Farrell . |
| 5,725,119 | 3/1998 | Bradford et al. . |
| 6,062,410 | 5/2000 | Bradford et al. . |

FOREIGN PATENT DOCUMENTS

| | | |
|---|---|---|
| 0612301 | 5/1993 | (DE) . |
| 2150118A | 6/1985 | (GB) . |
| 2218673A | 11/1989 | (GB) . |

Primary Examiner—Steven Pollard
(74) Attorney, Agent, or Firm—Wood, Herron & Evans L.L.P.

(57) ABSTRACT

A reusable and returnable container for holding product therein during shipment and subsequently being returned generally empty of product for reuse comprises a body configured for being manipulated into an erected position for containing a product placed therein during shipment and for subsequently being manipulated into a collapsed position for reducing the size of the container for return. An integrated dunnage structure is coupled to the body and is operable for moving into an engagement position when the container body is erected to thereby engage a product placed in the container for shipment. The dunnage structure is further operable for moving into a relaxed position when the container body is collapsed so that the container and dunnage structure may be returned together for reuse. The container provides reusable dunnage which is usable with the container when it is shipped and subsequently remains with the container when it is returned for being reused when the container is again shipped. In a preferred embodiment, pliable dunnage pouches are suspended in the container and collapse when the container is collapsed.

16 Claims, 6 Drawing Sheets

COLLAPSIBLE CONTAINER WITH INTEGRALLY SUPPORTED DUNNAGE

RELATED APPLICATIONS

This application is a divisional of patent application Ser. No. 09/033,680, filed Mar. 3, 1998, now U.S Pat. No. 6,062,410 entitled "Collapsible Container with Integrally Supported Dunnage," which in turn is a divisional of Ser. No. 08/608,476, filed Feb. 28, 1996, now U.S. Pat. No. 5,725,119, entitled "Collapsible Container with Integrally Supported Dunnage," which issued Mar. 10, 1998. Both the application and patent are hereby incorporated by reference in their entirety.

FIELD OF THE INVENTION

The present invention relates generally to shipping containers used to ship products, and more specifically to collapsible containers which are returnable in an empty state for reuse.

BACKGROUND OF THE INVENTION

Returnable and reusable containers are utilized by manufacturers to ship a variety of different products to end users which are usually assembly plants. For example, in the automobile industry, an assembly plant assembling a particular automobile might utilize a number of different parts manufacturers. These manufacturers ship their respective parts to the assembly plant in reusable containers where the parts are then assembled together into a finished automobile. The reusable containers are then returned to the parts manufacturers for use in further shipments. The return and reuse of such containers results in a substantial savings in shipping and packaging costs for the manufacturer, as may be appreciated, because they reduce the number of new containers which must be purchased. Furthermore, the returned containers alleviate the assembly plant's task of having to store, destroy, or otherwise dispose of the containers, thus resulting in substantial cost savings to the plant.

While such returnable and reusable containers reduce shipping costs by eliminating the need to constantly purchase new containers, it is still relatively costly to provide for their return shipment. This is particularly so since the charge rate for return shipment is based upon the volume of the container and upon the number of containers which might be situated in a return vehicle, such as a truck. With conventional containers used in the past, there has been a one-to-one (1:1) return-to-shipment ratio because an empty container occupies the same shipping space as a full container. Therefore, there is essentially not much of a shipping cost savings when returning an empty reusable container even though the empty container weighs less because it does not contain product.

Furthermore, the cost of storing conventional reusable containers reduces the economic benefits they offer because empty containers require the same warehouse or storage space as full containers. Container storage may be necessary for the plant before return shipment can be arranged. Similarly, the manufacturer will often store the containers on site to have them on hand and ready for shipment. Such storage space is often limited and it is usually desirable to utilize the space for something other than bulky, empty containers waiting to be shipped or returned. Therefore, the economic benefits of currently available reusable containers is further reduced by the cost both to the end user assembly plant and manufacturer in storage space requirements.

Some currently available reusable containers have addressed such problems by being collapsible into a smaller size or volume to thereby require less space when returned or stored. For example, some available reusable containers are collapsible into a volume essentially one-third (⅓) or one-fourth (¼) of their volume when shipped full of product. This provides a three-to-one (3:1) or four-to-one (4:1) return-to-shipment ratio, and thus, provides a substantial savings in return shipment costs. That is, a truck returning the containers to the originating site can carry three or four times the number of empty, collapsed containers as full containers. Additionally, collapsed, stored containers require substantially less storage space. One such currently available collapsible container is produced by the Ropak Corporation of Georgetown, Ky., and can be reduced or collapsed to a size which is one-third (⅓) the size of a full, erected container. Another collapsible and reusable container is available from MONOFLO International, Inc. of Winchester, Va. and reduces to one-fourth (¼) the size of the erected container.

While such containers address the issue of return shipment and storage costs, they still have certain drawbacks. For example, it may be necessary to utilize dunnage elements, such as partitions or separating structures, in the container during shipment for separating and protecting the products shipped in the container. The separate dunnage elements must be handled accordingly apart from the container during shipment and return. That is, when the container has been assembled into an erected form for shipment and dunnage elements are to be utilized, the dunnage must be separately inserted and secured within the container. Subsequently, prior to return shipment, any dunnage elements utilized within the container must be detached and removed therefrom before the container can be collapsed into the smaller, returnable shape. As may be appreciated, the dunnage elements are then discarded or otherwise disposed of by the assembly plant adding to the plant's overall cost for the shipment. Furthermore, the manufacturer must construct or acquire new dunnage elements each time the returned container is reused for shipment and thus must incur the necessary costs associated therewith. Additionally, the manufacturing labor associated with constructing and installing dunnage elements in a container, and then the plant labor for collapsing, removing and disposing of the dunnage elements after shipment, further increases the cost of shipping product utilizing conventional containers. Therefore, even with collapsible containers, high shipping costs are incurred on both ends, i.e., by the manufacturer who constantly acquires new dunnage elements and by the assembly plant which constantly must dispose of the old dunnage elements or pay to have those dunnage elements returned with the container.

The current prior art products have not recognized such a problem and certainly have not addressed the resulting high shipping costs. Accordingly, it is an objective of the present invention to reduce the overall shipping costs normally associated with shipping product. It is another objective to reduce such shipping costs associated with both original shipment and return shipment.

It is further an objective of the present invention to reduce the manufacturer's time and labor costs associated with erecting a container and constructing and securing dunnage elements therein to protect the shipped product.

It is still another objective to reduce the manufacturer's replacement costs of dunnage elements for returned, reusable containers.

It is an additional objective to reduce storage space requirements associated with reusable containers and/or dunnage materials.

It is still another objective of the present invention to reduce the time and labor costs to the assembly plant associated with removing, dismantling and discarding used dunnage elements prior to collapsing and returning empty containers.

It is further an objective of the present invention to provide a returnable and reusable container which adequately contains and protects product shipped therein and will occupy less space during return shipment than during original shipment.

These objectives and other objectives will become more readily apparent from the further description of the invention below.

SUMMARY OF THE INVENTION

The present invention comprises a reusable and returnable container which has collapsible dunnage therein which is returnable and reusable along with the container. The body of the container is configured and operable for being manipulated into an erected position for containing product placed therein during shipment and for subsequently being manipulated, when empty of product, into a collapsed position for reducing the size of the container for return shipment. Dunnage structures are positioned generally inside the container body and are operably coupled to the body in accordance with the invention. The dunnage structures move into an engagement position when the container body is erected to thereby engage and protect product placed in the container for shipment. The dunnage structures also move into a relaxed position when the container body is emptied of product and is subsequently collapsed so that the container and integrated dunnage structures may be returned together for reuse. To reuse the dunnage structures, the container is simply erected for another shipment and the dunnage structures will again move into the engagement position. Therefore, the invention provides reusable dunnage to protect shipped product and the dunnage is returnable with the returned container and will always remain with the container. Therefore, the dunnage does not have to be separately assembled and placed in the container. Furthermore, the dunnage does not have to be removed from the empty container and discarded or otherwise handled. The invention further provides dunnage which is always ready for use and which does not affect the operation and collapsibility of the container. The dunnage is generally protected by the body of the container both during product shipment and during return shipment.

Since, the dunnage structures of the invention are operable to return to an engagement position or support position when the container is erected for shipment, new dunnage does not have to be constantly purchased by the manufacturer for shipping product, thereby resulting in substantial cost savings to the manufacturer. Additionally, specialized labor is not required to construct and secure dunnage within the container, because the dunnage structures are already constructed and secured upon erecting the container, thus yielding additional cost savings for the manufacturer. At the plant, the dunnage does not have to be removed, disassembled and discarded, thereby yielding substantial savings in labor costs and disposal costs for the assembly plant. Both the manufacturer and plant also benefit from the reduced shipping and storage requirements of the collapsed container.

One embodiment of the invention comprises a collapsible container having a body with a pallet base or bottom and four opposing, collapsible side wall structures or side walls which are hingedly coupled to the container bottom along bottom edges thereof. The side walls are movable between an erected position generally perpendicular to the bottom and a collapsed position whereby they are folded inwardly of the container to rest adjacent the bottom for reducing the volume of the empty container body prior to storage or return shipment. Pliable dunnage pouches are operably coupled to the side walls.

In one embodiment, rail elements extend along the upper edges of two opposing side walls, generally parallel to the side walls. When the side walls are erected, multiple flexible support structures, preferably flexible cables, extend between the opposing side walls with their ends secured to the rail elements to span across the container. The pliable dunnage pouches, made of a suitable cloth or plastic material, are secured to the support cables, such as by sewing or heat sealing, and are suspended therefrom so that the bottoms of the pouches are preferably held above or are attached to the container bottom of the erected container. Attachment may be used to keep the pouches in position. Products for shipment may then be inserted into the pouches and are held and protected therein during shipment. The pouches engage and contain the products and prevent drastic movement within the container and further separate the products to prevent abrasion or breakage during shipment.

Alternatively, the pouches might be coupled at their ends directly to the side walls thereby eliminating the support cables. In such an embodiment, the side walls would suspend the pouches rather than the cables.

To collapse the container, the opposing side walls are hinged down against the container bottom. When the side walls supporting the dunnage pouches are collapsed and are folded inwardly along their hinged bottom edges, the dunnage pouches are dropped into the bottom of the container body. The pouches drop with the flexing support cables which are relaxed or simply drop with the walls in the absence of cables. Preferably, the opposing side walls supporting the dunnage pouches are hinged downwardly first and are then overlapped by the other set of side walls to form the collapsed container. When the set of side walls supporting the dunnage pouches are collapsed first and then are covered or overlapped by the other set of opposing side walls, the dunnage is completely secured to and preferably contained within the collapsed container. The collapsed container, including dunnage, may then be shipped or stored as a unit and is ready for reuse in accordance with the principles of the invention. In a preferred embodiment, the vertical height of the collapsed containers is about one-third (⅓) the height of the erected container to provide a three-to-one (3:1) return-to-shipment ratio.

In the embodiment of the invention using rail elements and cables, the cables are preferably slidably coupled to the rail elements for sliding the pouches as desired in the container. Preferably, tensioners are connected in-line with the cables to ensure proper tension on the cables for proper product support and protection by the dunnage pouches. Alternatively, the support cables might be rigidly attached and secured directly to the side walls without any rail elements.

In an alternative embodiment of the invention, the container comprises a collapsible and carryable tote having a generally smaller size body than the pallet container previously described so that it may be handled manually. One embodiment of the tote container of the invention has a body which includes a bottom element, a top element and separate collapsible side walls extending therebetween. Another tote container embodiment has a unitary body which has integrally connected side walls. Dunnage, such as dunnage pouches, are coupled to the tote container body for being used during shipment and returned with the container as described.

One version of the tote container embodiment includes support structures, such as flexible support cables, which are operable to suspend dunnage pouches in the tote container when the side walls are erected. Preferably, the cables are coupled to rail elements proximate the top of the container and are slidable thereon for moving the pouches laterally in the tote container. Alternatively, the cables might be fixed directly to the container at the top thereof rather than to a rail element. Preferably, tensioner elements in-line with the cables provide tension on the cables.

Alternatively, the dunnage pouches are coupled at their ends to the side walls or to the top element and are supported without cables. The pouches are then raised and lowered when the side walls are erected or collapsed as described.

The flexible support cables and dunnage pouches are lowered when the opposing side walls of the tote container are collapsed to thereby drop the dunnage pouches between the side walls and to the bottom of the tote container. Unlike the pallet container embodiment previously described, the cables and pouches are not completely relaxed or flexed when the body of the tote container is collapsed because the side walls are folded down at their middle rather than folded inwardly from the bottom. The top of the container generally maintains its rectangular shape but is simply lowered toward the bottom of the container to lower the pouches. Therefore, the cables or pouches are always stretched between the opposing sides of the tote container.

More specifically, a first set of side walls hinge at a top edge thereof and are movable between a vertical position and a horizontal position proximate the top of the body. The other set of side walls folds inwardly of the container generally in the middle of the side wall to lower the top of the container against the bottom of the container to reduce the overall height of the container. More particularly, an upper edge of the side wall is hingedly coupled to the top of the body while a lower edge of the side wall is hingedly coupled to the bottom of the body. The side walls also hinge inwardly intermediately between the top and bottom of the body. By folding the side walls inwardly at their intermediate hinges, the side walls collapse and are folded generally in half to lower the top of the body toward the bottom of the body, and thus collapse the container and dunnage.

To collapse the tote container, the respective side walls having the single hinged edge are moved upwardly toward the top of the container to lie in a generally horizontal plane. Next, the foldable side walls are hinged at their top and bottom edges and generally in the middle simultaneously to fold the side walls into the center of the container so that the top of the container is lowered to a position adjacent the bottom of the container. As may be appreciated, when the first side walls are hinged, the pliable pouches are pushed upwardly from below and collapse to rest on top of the side walls and generally adjacent to the top of the container. In that way, the collapsed dunnage pouches are lowered to the container bottom when the container body is collapsed and the vertical height of the container is reduced for return shipment.

To reuse the tote container and dunnage pouches, the top of the container is lifted above the bottom of the container, and the folded side walls are again erected outwardly from the center for suspending the dunnage pouches. Then, the other hinged side walls are swung downwardly to the vertical position to complete the erected container and to drop the dunnage pouches so that they are again suspended from the top of the container. The non-folding walls maintain the container in the erect shape. In a preferred embodiment, the tote container collapses to a vertical height approximately one-fourth (¼) the height of the erected tote container, thereby yielding approximately a four-to-one (4:1) return-to-shipment ratio.

Another alternative embodiment of the invention comprises a reusable and returnable rack container which has a collapsible frame. The frame has a bottom or base element and a top element situated vertically above the bottom element. A plurality of vertical legs are positioned between the bottom and top elements. The legs are operable for raising and lowering the top of the frame to erect and collapse the rack. Dunnage, and preferably dunnage pouches are supported on the rack in accordance with the principles of the invention.

In one embodiment, each leg is hingedly coupled to the top frame element at an upper end and to the bottom frame element at a lower end. The legs hinge along their length between the top and bottom ends thereof and preferably have a hinge structure situated proximate the middle of the leg. To collapse the rack, the respective hinged legs are folded in half and inwardly to lower the top element or top of the frame toward a position adjacent the bottom or bottom element of the frame. In that way, the dunnage pouches are lowered and collapse to lie nested with the top and bottom elements of the frame. The vertical height of the rack is reduced and the rack is ready for return shipment.

In an alternative embodiment, the rack legs are of a telescoping construction and will telescope in length to erect and collapse the rack container. To reuse the rack container, the top of the frame is lifted above the bottom of the frame, and the legs are again erected to suspend the dunnage pouches. The hinged legs and telescoping legs are operable to lock in an erected position to keep the frame erect when so desired.

The rack container embodiment utilizes a collapsible dunnage structure as previously described. For example, dunnage pouches may be suspended from flexible cables or may be fixed at their ends directly to the rack container frame. When the rack container is collapsed, the dunnage is dropped to the bottom of the frame.

In still a further alternative embodiment of the invention, a container comprises a base, a top, and a collapsible sleeve pack therebetween for containing the product and supporting the dunnage. More specifically, the sleeve pack includes two opposing, non-foldable side walls and two opposing foldable side walls, which are hingedly coupled, along vertical edges thereof, to the non-foldable side walls. The dunnage of the invention is coupled to either the foldable or non-foldable side walls.

When the container is erected, the dunnage pouches are held in an engagement position to engage, contain and protect product placed therein. The dunnage pouches are held in the engagement position by flexible cables extending between two opposing side walls which are fixed to the side walls as described above. Alternatively, the ends of the pouches may be fixed to the side walls without cables.

To erect the container, the foldable side walls are situated to extend generally perpendicular to the non-foldable side walls to form a sleeve pack which is fitted into a base and covered by a top. When the container is erected, the dunnage pouches move from a relaxed or collapsed position to an engagement position. A reinforcement bar may be used proximate one or both of the foldable side walls to maintain the container in an erected position.

To return the container, the sleeve pack is removed from the bottom and is collapsed by folding the foldable side walls inwardly to be positioned between the non-foldable side walls. The sleeve pack is thus flattened. In doing so, the dunnage pouches are moved to the collapsed position between the walls of the sleeve pack. The flattened sleeve packs are then stacked and returned, occupying considerably less space than an erected sleeve pack container, and the dunnage remains with the sleeve pack to be re-used when the sleeve pack is again erected for a container.

Therefore, the collapsible container of the invention may be collapsed into a form having a lower height and a smaller volume which is preferably only about one-third (⅓) or one-fourth (¼) of the volume of the erected container. The usable and reusable dunnage therein remains with the container and is stored in the container in the collapsed state and automatically transforms into usable dunnage when the container is in the erected state. Accordingly, no dunnage removal and disposal costs are associated with collapsing the container for storage and return and no dunnage manufacturing and assembly costs are associated with erecting and shipping the container full of product because the dunnage is reusable with the container. The present invention thereby represents a substantial cost savings both in material costs and labor costs normally associated with handling dunnage when containers are shipped or returned. Furthermore, the erected container of the invention maintains usable integral dunnage while still being collapsible to a smaller volume for reducing storage and return shipment costs.

The above and other objects and advantages of the present invention shall be made apparent from the accompanying drawings and the description thereof.

BRIEF DESCRIPTION OF THE DRAWINGS

FIG. 1 is a perspective view of an embodiment of the collapsible container with integrally supported dunnage of the invention showing an erected container with the dunnage in the engagement position to receive product;

Figure 1A:
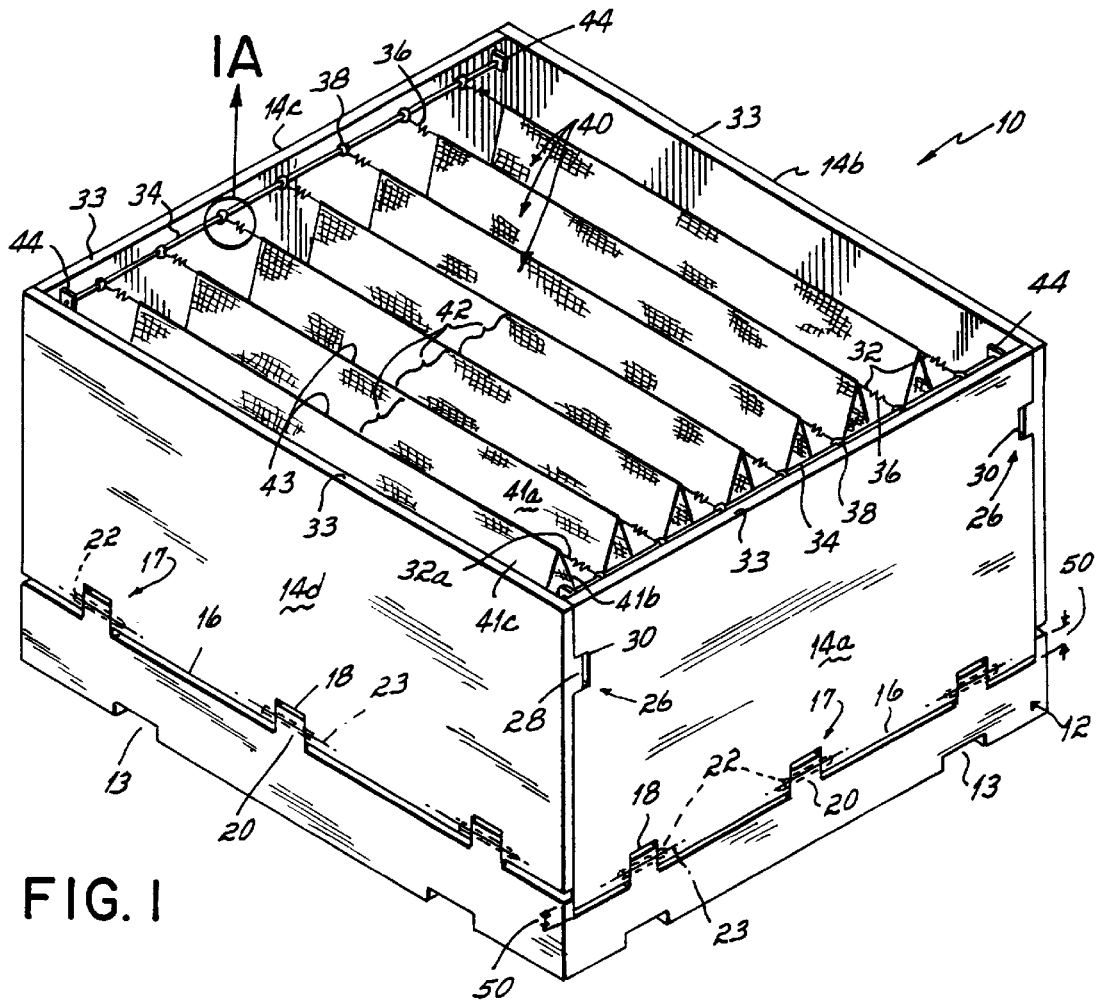
FIG. 1A is a cut-away view of FIG. 1 as indicated illustrating one way of coupling support structures to the side walls of a container.
Figure 1A:
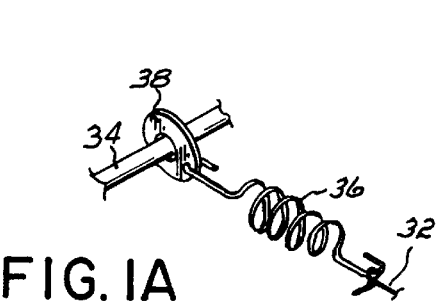

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

FIG. 1 shows a container constructed in accordance with the principles of the present invention, and particularly illustrates a container 10 having a pallet base 12 and often referred to as a pallet container. Container 10 is configured for being stacked and lifted from below by a device such as a forklift. Container 10 comprises a pallet bottom or base 12 having four side wall structures or side walls 14a, 14b, 14c and 14d (14a–14d). The base 12 may have bottom channels 13 for receiving the forks of a forklift truck. The side walls are arranged to oppose each other such that side wall 14a is opposed by side wall 14c and side wall 14b is opposed by side wall 14d to form a generally rectangular boxed-shaped container. The opposing side walls 14a–14d are hinged on a bottom edge 16 thereof for folding downwardly onto the pallet base or bottom 12 (see FIGS. 2 and 3). In that way, the container 10 may be collapsed into a container of reduced size for return shipment at a reduced cost as is discussed further hereinbelow (see FIG. 3).

In a preferred embodiment of the invention as is illustrated in FIG. 1, the side walls are hingedly attached to base 12. For example, side wall 14a includes a plurality of regularly spaced hinge structures 17 which include indentations 18 configured to receive upwardly extending projections or tabs 20 on the base 12. An elongated hinge pin 22 extends through appropriate openings (not shown) in the side wall indentations 18 and projections 20. The hinge structures allow the side walls 14a–14d to hinge inwardly of the container 10 and toward base 12 on the hinge axis 23.

Figure 1B:
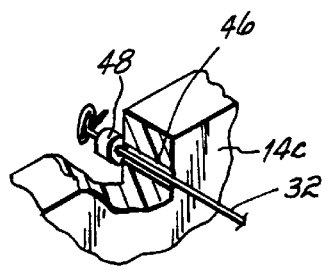
FIG. 1B is a cut-away view of an alternative embodiment of the invention illustrating another way of coupling support structures to the side walls of a container.
Figure 1C:
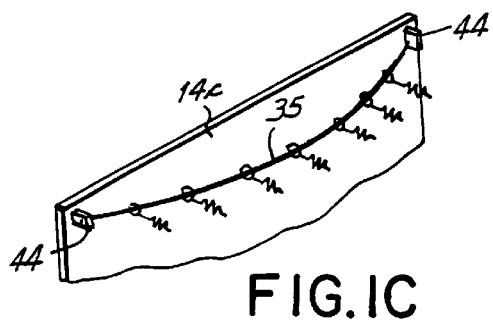
FIG. 1C is a cut-away view of another alternative embodiment of the invention illustrating another way of coupling support structures to the side walls of a container.
Figure 1D:
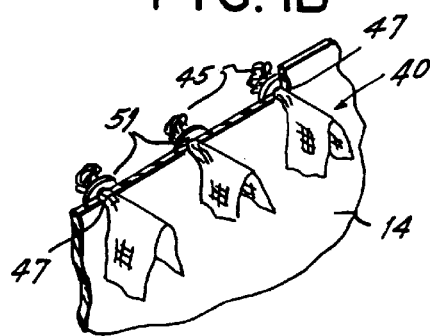
FIG. 1D is a cut-away view of another alternative embodiment of the invention illustrating dunnage pouches coupled directly to the side walls of the container.
Figure 2:
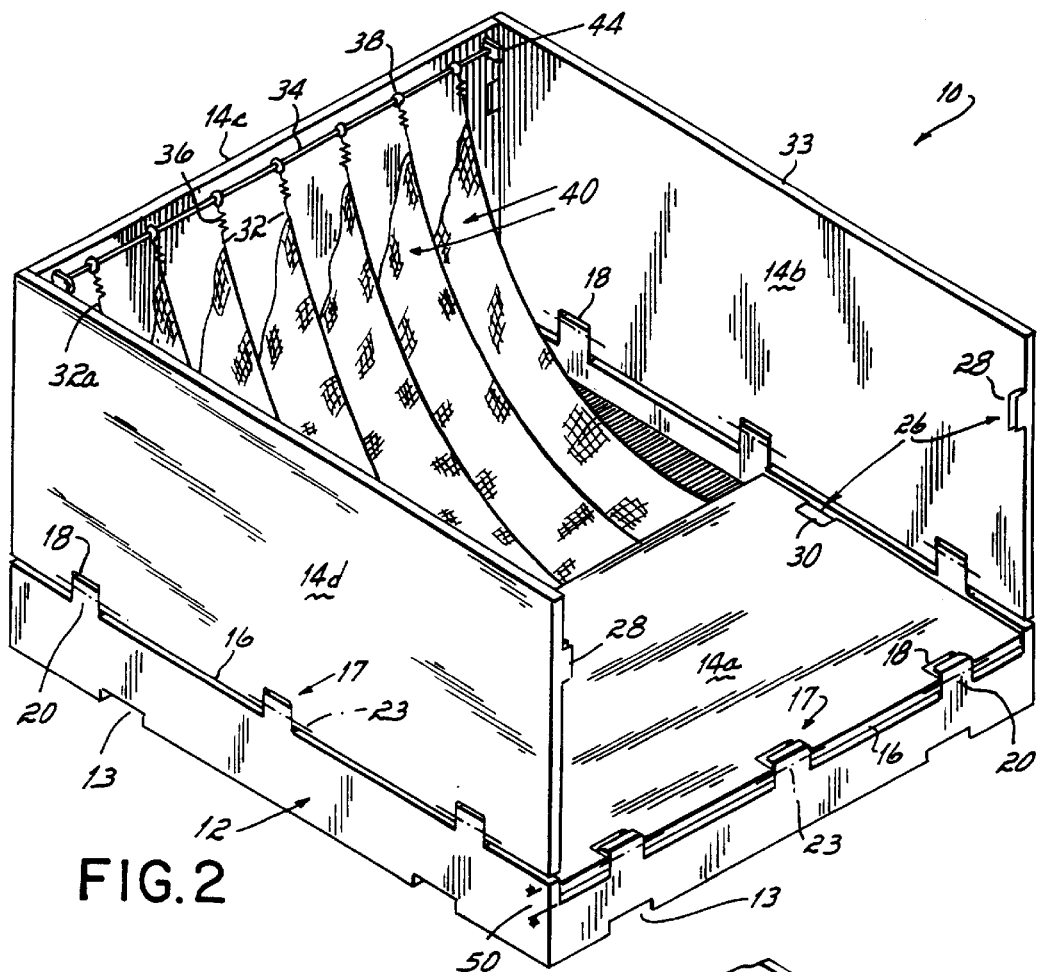
FIG. 2 is a perspective view of the container of FIG. 1 with one of the side walls in a collapsed position and dunnage moving to a collapsed position.

As illustrated in FIG. 2, the hinge structures 17 created by the cooperating projections 20 and indentations 18 and hinge pins 22 allow the side wall 14a to be moved from an erected position (FIG. 1) to a collapsed position (FIG. 2). The remaining side walls 14b, 14c and 14d are also hingedly attached to base 12 with hinge structures 17 and will similarly move between an erected position to erect the container and a collapsed position to collapse the container 10. As will be appreciated by a person of ordinary skill in the art, other hinge structures than those shown might also be utilized.

When the container is assembled for use and shipment of product, the side walls 14a–14d are moved to an erected position as illustrated in FIG. 1. Adjacent side walls, such as side wall 14a and sidewall 14d, include cooperating members of a latching structure 26 for holding the side walls in an erected position. For example, latching structure 26 might include a tab 28 extending from side wall 14d which is received by an appropriately structured groove or indentation 30 on the adjacent side wall 14a. The tab 28 and indentation 30 are appropriately configured to cooperate when the side walls are erected to latch the side walls in an erected position. They are subsequently releasable by pulling the tab 28 away from indentation 30, for example, to collapse the side walls (see FIG. 2).

In accordance with the principles of the present invention, container 10 includes a dunnage structure which is coupled to the side walls and positioned generally inside the body of the container 10 formed by base 12 and the opposing side walls 14a–14d. In one preferred embodiment, the dunnage structure includes a plurality of pliable pouches 40 which are supported by support structures, such as flexible cables 32, which are coupled between support rails 34 between two opposing side walls, such as 14a and 14c. The pouches 40 may be made of, for example, a fabric or cloth material, such as heavy canvas, or plastic, such as a polyethylene or polyester. Referring to FIG. 1, the cables 32 span between the opposing side walls 14a, 14c when the side walls are in an erected position to form container 10. Cables 32 are preferably coupled to the support rails 34 through a tensioning device, such as spring 36 as illustrated in FIG. 1A. The spring is attached at one end to a slidable collar piece 38 which encircles rail 34 and slides thereon for adjustment of the spacing between adjacent cables 32 and pouches. The cable 32 is simply clamped, tied or otherwise fastened to the other end of spring 36.

The pliable dunnage pouches 40 are secured to the cables 32 and are suspended downwardly therefrom to hang inside of the container body 10. Each pouch has opposing sides 41a, 41b to contain and protect product placed in the pouches 40. An opening 42 to each dunnage pouch 40 is formed between adjacent support cables 32 so that a product, such as an automobile part, can be placed into the pouch for shipment. The dunnage pouches 40 engage the product and support the product in the container when the pouches are in their engagement position as illustrated in FIG. 1. The adjacent parts in each of the dunnage pouches 40 are protected by the pouch sides 41a, 41b from abrasions or breakage and the pouch is suspended above the container base 12 during shipment. In one version, as illustrated in the Figures, a cable 32 supports a wall for two adjacent pouches. For example, cable 32a supports pouch wall 41b and also supports the pouch wall 41c of an adjacent pouch. Alternatively, each pouch wall might require a cable. Preferably, the upper edges 43 of the pouches 40 are sewn around the cables 32 or are heat sealed around the cables for plastic pouch versions. Alternatively, some other fastening methods might be used to fix the pouches to the cables. The pouches may also be fixed directly to the walls as described below (FIG. 1D).

To ship product, the side walls 14a–14d are hinged into an erected position and latched therein by latching structures 26. Upon erecting containers 10, the support cables 32 are stretched by the support rails 34 which are coupled to the opposing side walls 14a and 14c by suitable mounting structures 44. When the cables 32 are stretched, the pouches 40 are suspended within container 10 and are ready to receive product for shipment. Once the product is placed in the pouches, the full container may then be shipped and the products will be protected both by the container side walls 14a–14d and the integral suspended dunnage pouches 40. The tension element or spring 36 insures that pouches 40 are sufficiently suspended and the spring preferably has an elasticity which is suitable for suspending a pouch full of the product to be shipped in the container 10. Spacing between the various cables 32 and pouches 40 and the size of the openings 42 for the respective dunnage pouches 40 may be changed by sliding the collar pieces 38 on respective cables 32 along the support rails 34.

In accordance with the principles of the present invention, the dunnage structure of container 10, such as the dunnage pouches 40, are integrally operable with the container body 10 such that when the side walls 14a–14d are erected to form the container body, the support rails 34 and cables 32 simultaneously erect the dunnage pouches into an operable or engagement position. After the product has been removed from the various dunnage pouches 40, and the container 10 is ready to be returned to the manufacturer, the side walls 14a–14d are moved to a collapsed position and the pouches to a relaxed position to reduce the size of the container for a more inexpensive return shipment.

In an alternative embodiment of the invention as illustrated in FIG. 1B, the cables 32 might be fixed directly to side walls 14a, 14c through an opening 46 formed in the side wall such as side wall 14c. The end of the cable is then secured to the side wall, such as with a cable clip 48 or other suitable fastening structure. The cable 32 illustrated in FIG. 1B would then not generally be adjustable along the side wall but would be fixed in its lateral position in the container 10. Similar to the embodiment illustrated in FIG. 1, the dunnage cables 32 directly fixed to the side walls 14a and 14c would be moved into a suspended position to span between the erected sidewalls 14a and 14c when the container is erected. Furthermore, the flexible cables will relax when the side walls are moved to a collapsed position.

FIG. 1D illustrates another version of the container of the invention wherein the various support structures are eliminated. Therein, the dunnage structures, such as pouches 40, are directly coupled to the side walls without cables 32. For example, the pouches 40 have ends 45 which extend through openings 47 formed in the side walls. The pouch ends 45 are secured to the side walls 14 by mounting collars 51 or other appropriate devices. When the side walls collapse, the pouches move to a collapsed position in accordance with the principles of the present invention. In another version, the pouches 40 may be directly coupled to intermediate structures, such as rails 34, which are, in turn, coupled to the walls 14a–14d.

Referring to FIG. 2, the latching structures 26 are undone and the opposing side walls 14a–14d are hinged downwardly to fold against the base 12 and preferably inwardly on the base when the container 10 is collapsed. When the side walls are moved to the collapsed position to reduce the size of the container 10, the support cables 32 are relaxed such that the dunnage pouches 40 fall down into a collapsed positioned and onto the base or the bottom 12 of container 10. FIG. 2 illustrates side wall 14a in a collapsed position.

Similarly, opposing sidewall 14c also moves to a collapsed position such that the dunnage pouches 40 relax onto the base 12 of the container with the side walls 14a, 14c covering the dunnage pouches 40.

FIG. 1C illustrates an alternative embodiment of the support rail 34 which might be utilized. Rail 35 is a flexible element, such as a cable, and is fastened between support structures 44 to suspend the support cables 32. Alternatively, the ends of the rail cable 35 might be fixed directly to the side walls 14a–14d of the container, as appropriate, as illustrated in FIG. 1B for example. This would eliminate the need for structures 44.

Preferably, the dunnage pouches 40 are made of pliable fabric or plastic of suitable strength which readily relaxes with the flexible support cables 32 when the side walls are collapsed yet has sufficient strength for supporting and protecting the shipped product when the side walls are erected to form the container 10. The support rails 34 are positioned at the top edges 33 of the side walls in order to suspend the pouches generally above base 12 in the erected container 10. Suspending the dunnage pouches 40 above base 12 will prevent the product in the pouches from bouncing against the base when the container is shipped. However, the pouches 40 might be attached at their bottom ends (not shown) to base 12 to keep the pouches from moving around during shipment.

Figure 3:
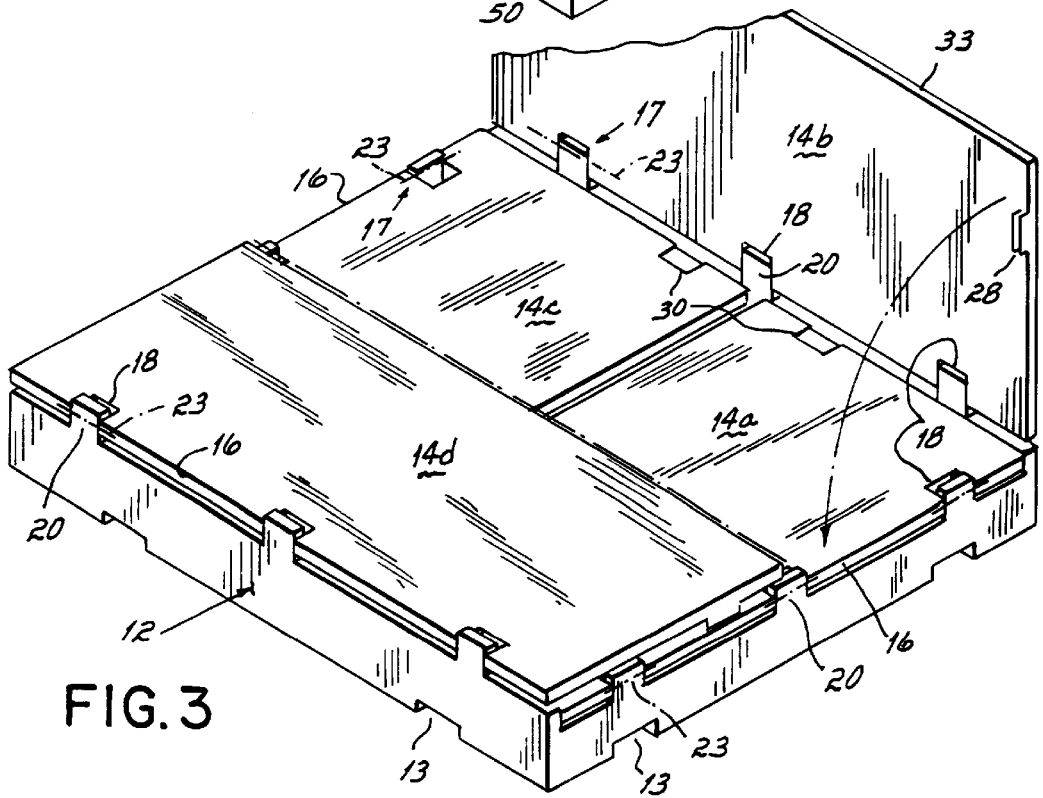
FIG. 3 is a perspective view of the container of FIG. 1 with three of the side walls in a collapsed position illustrating the smaller volume occupied by a collapsed container.

Referring now to FIG. 3, when the side walls 14a and 14c have been collapsed, the other opposing sides walls 14b and 14d are then collapsed to overlap side walls 14a, 14c. Side walls 14b and 14d are moved to a collapsed position to overlap the already collapsed side walls 14a, 14c and the dunnage pouches 40 to thereby contain the dunnage pouches within the container when it is returned. Preferably, the opposing side walls 14b, 14d that will form the top of the collapsed container will hinge from a position slightly above the overlapped collapsed side walls to form a flat, stackable return container. Referring to FIG. 3, a vertical allowance 50 is made on the base 12 so that side walls 14b, 14d may easily overlap the collapsed side walls 14a, 14c and thus lie flat and flush with the top of the return container 10. Preferably, the collapsed container 10 will have approximately one-third (⅓) the height of an erected container so that generally three collapsed and returned containers can be shipped back to the manufacturer in a space or volume normally occupied by one fully erected container. In that way, shipping costs are reduced and generally three collapsed containers can be returned for the price a single erected container (i.e., a 3:1 return-to-shipment ratio). Additionally, the collapsed containers occupy significantly less storage space per unit thereby reducing storage costs as well as reducing shipping costs.

Furthermore, the container 10 of the invention provides integral reusable dunnage structures which remain with the reusable container 10 when it is shipped full of product and also when it is returned for reuse. Simply by erecting the container for shipment, the dunnage structures are moved into place in their engagement position by the support structures, like cables 32, and are ready to receive product therein. No additional steps or labor is required to assemble and construct the dunnage structures or to position the dunnage structures within the container 10. The dunnage structures of the invention, which are illustrated as dunnage pouches 40 in the preferred embodiment of FIGS. 1–3, will automatically be suspended within the container to receive product upon erecting the side walls 14a–14d. Furthermore, the dunnage pouches 40 do not have to be removed from the container 10 when the container is collapsed for return shipment and reuse. Simply moving the side walls to a collapsed position to the reduce the size of the container automatically relaxes the dunnage pouches 40 into the base 12 of the container 10 for return shipment along with the container. It is no longer necessary to utilize labor resources to remove, disassemble, and dispose of the dunnage structures thereby resulting in substantial labor cost savings for the assembly plant or other customer. Furthermore, disposal costs are eliminated because the dunnage structures are reused along with the container and do not have to be recycled or wasted. When the container is erected, the dunnage pouches 40 adequately engage, support and protect the product shipped in the container to prevent damage thereto. Therefore, the reusable and returnable container with collapsible reusable dunnage provides substantial shipment, storage, labor and materials cost savings to both the product manufacturer shipping the product and the customer who must return the reusable container to the manufacturer.

FIGS. 4, 5, 6, 7, 8, 9, 10 and 11 illustrate alternative embodiments of collapsible container structures with integrally supported dunnage structures in accordance with the principles of the present invention.

Figure 4:
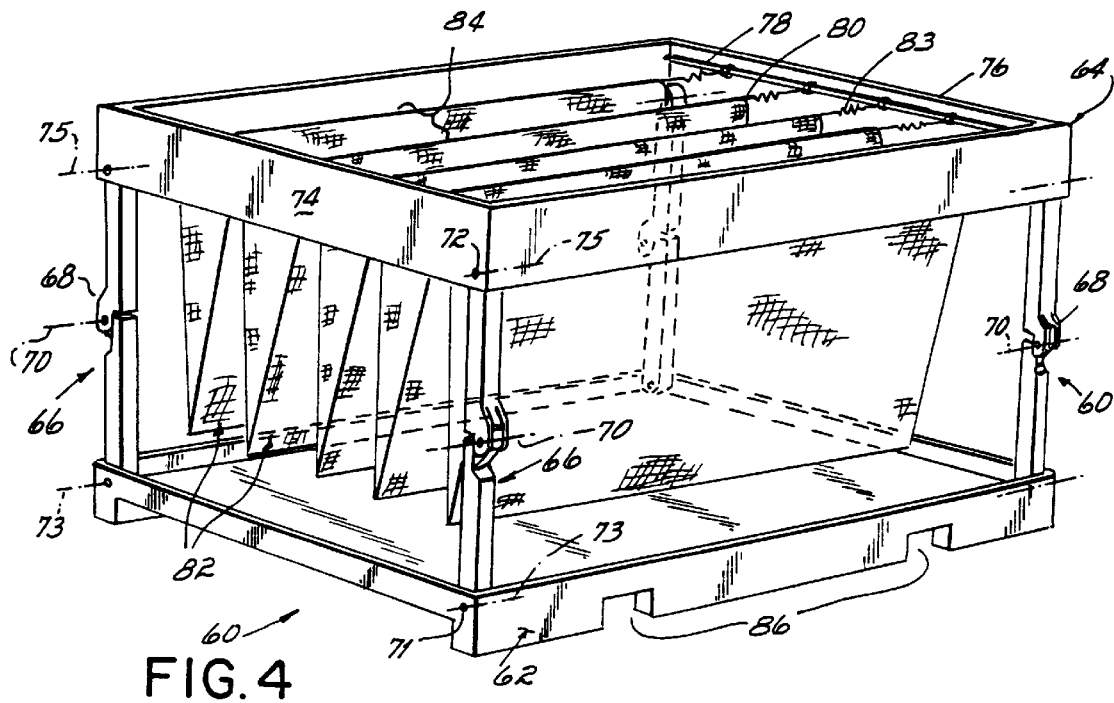
FIG. 4 is a perspective view of an alternative embodiment of the collapsible container with integrally supported dunnage of the invention showing the container in a fully erected position.

FIG. 4 illustrates a shipping rack container or rack 60 which includes a frame having a generally rectangular bottom or base member 62 and a somewhat similarly-shaped top member 64 positioned vertically above the base member 62. Collapsible legs 66 extend between the base member 62 and top member 64 and include hinge elements 68 along their length to provide for collapsing of the legs 66 along a hinge axis 70. The legs are hingedly coupled to the base members 62 and top member 64 by appropriate fasteners, such as rivets or pines 71, 72, respectively, for hinging the legs along axes 73 and 75. The sides of the frame are generally open.

FIG. 4 illustrates the rack container or rack 60 of the invention in an erected position for containing and shipping product therein. In accordance with the principles of the present invention, two opposing sides 74, 76 of the top member 64 include elongated support rail elements 78, which extend generally the entire length of the sides 74, 76. Flexible support structures or cables 80 span between the rail elements 78 of sides 74, 76 and support dunnage structures, such as dunnage pouches 82, on the rack 60. When the frame of rack 60 is erected, i.e., when the collapsible legs 66 are in an erected position, the dunnage pouches 82 are suspended by the cables 80 generally above the base member 62 of the rack 60. As disclosed above, the pouches 40 are preferably made of a strong, pliable fabric of cloth or plastic and are sewn or heat sealed at top edges thereof to the cables 80. Preferably, tensioning elements such as springs 83 provide tension on the cables 80 for proper support of the dunnage pouches 82 when filled with product. When a product is placed within the dunnage pouches 82, it is protected from abrasion and damage during shipment. Similar to the dunnage pouches 40 in FIGS. 1–3, the dunnage pouches 82 each have any opening 84 formed between adjacent support cables 80. Once product is loaded into the pouches 82 with the frame of rack 60 in the erected position, the product is ready for shipment either in a single rack or in several racks stacked one on top of another or positioned side-by-side, such as in a truck. The bottom member 62 of the frame may include appropriately formed openings 86 to received the forks of a forklift.

When the customer has unloaded all of the product from the dunnage pouches 82, rack 60 is collapsible for return shipment to the manufacturer for reuse in future shipments.

Figure 5:
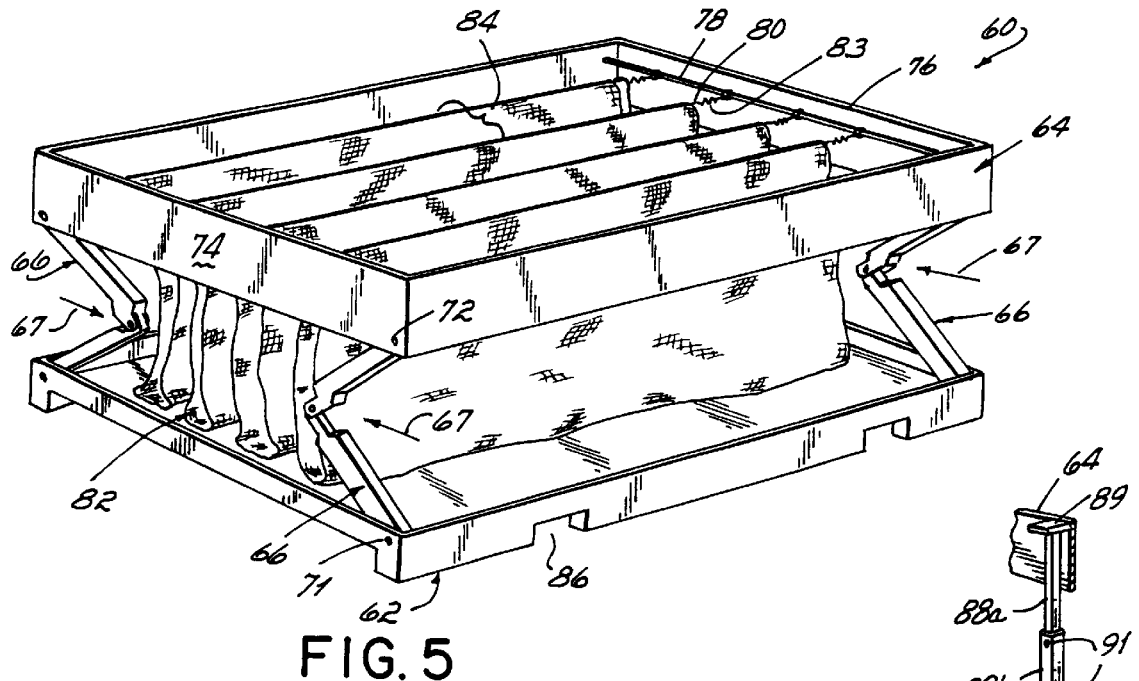
FIG. 5 is a perspective view of the container of FIG. 4 showing the container collapsing to a smaller volume with dunnage therein in accordance with the principles of the present invention.

To that end, the legs 66 of the rack frame are operable to hinge such that the legs fold inwardly toward the center of the rack as illustrated in FIG. 5. Locking structures (not shown) might be utilized with the leg hinge elements 68 to lock the legs in an erected position 66 and to subsequently be engaged to collapse the frame legs 66. To collapse the legs 66, they are pushed inwardly in the direction of arrow 67 to fold at the hinge elements 68. The top ends of the legs pivot along axis 75, while the bottom ends pivot along axis 73 so that the legs 66 may be folded as illustrated in FIG. 5.

When all of the legs 66 are simultaneously folded to a collapsed position, the top member 64 is lowered to a position adjacent to and above the base member 62. The collapsed legs 66 fold inwardly toward the center of rack 60 and are effectively sandwiched between the top member 64 and base member 62. The pliable dunnage pouches 82 are operable to relax to a collapsed position when the rack is collapsed to provide a return rack complete with dunnage, which occupies substantially less space than the erected rack. Referring to FIG. 5, the pliable pouches 82 fold or crumple when the top member 64 is lowered. Preferably, the collapsed rack is only about one-third (⅓) of the height of the erected rack so that three stacked and empty racks may be returned or stored in the same space normally occupied by an erected rack full of product.

The dunnage pouches 82 are coupled to the rack frame and particularly to the top member 64 of the rack frame to remain with the rack whether collapsed or erected. When the rack is again erected, the dunnage pouches 82 are again suspended generally above the base member 62 by cables 80 so that product placed in the pouches will be protected by the pouches and the rack 60 during shipment. Unlike the embodiment of the container of FIGS. 1–3, cables 80 of rack 60 span between the ends 74, 76 of top member 64 regardless of whether the rack is erected or collapsed because the ends 74, 76 do not hinge or fold inwardly to the center of the rack. That is, cables 80 remain under tension whether the frame of rack 60 is collapsed or erected. The rack 60 illustrated in the FIGS. 4–5 will be utilized for transporting large parts, such as automobile door panels or the like and thus will generally be lifted by a machine such as a forklift.

Like the container of FIGS. 1–3, rack container 60 might also utilize dunnage structures other than those shown in FIGS. 4 and 5. For example, cable attachments in FIGS. 1A, 1B or 1C might be utilized. Similarly, the pouches or other dunnage structures might be fixed or otherwise coupled directly to the top member 64 in a fashion similar to that shown in FIG. 1D.

Figure 5A:
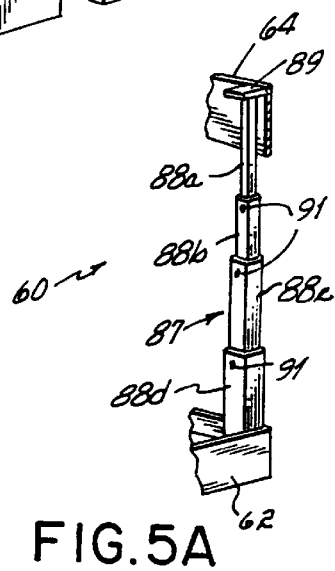
FIG. 5A is a cut-away view of an alternative version of a support element of the container illustrated in FIGS. 5 and 6.

FIG. 5A illustrates an alternative collapsible leg structure for collapsing rack 60. Leg 87 is configured for telescoping to a shorter length for collapsing rack 60. To that end, leg 87 includes telescoping segments 88a, 88b, 88c and 88d. The bottom segment 88d is coupled to base member 62 while the top segment 88a is mounted to top member 64. The top segment 88a is fixed to top member 64 by a stand-off structure 89 for ensuring that the leg segments will nest properly without interfering with the top member when the rack 60 is collapsed and the legs 87 are telescoped to their shorter length. The leg 87 includes ball detentes 91 or other appropriate structures which hold the leg in the erected position. The ball detentes 91 are engaged appropriately to collapse leg 87.

Figure 6:
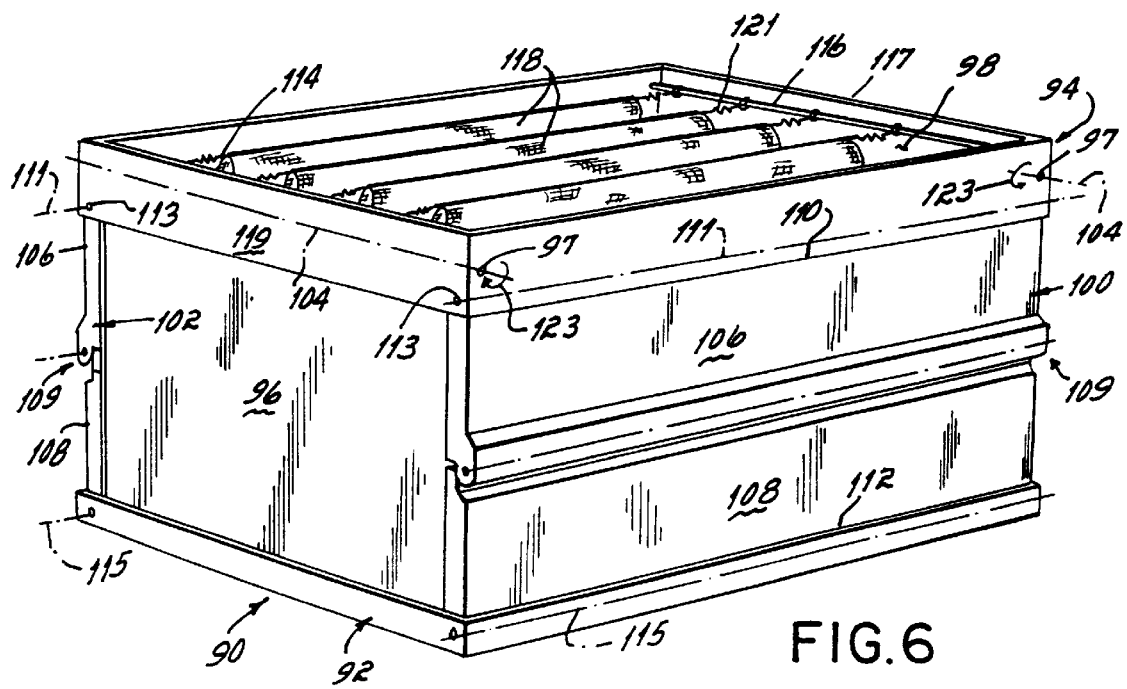
FIG. 6 is a perspective view of another alternative embodiment of the collapsible container with integrally supported dunnage of the present invention showing the container in an erected position.
Figure 7:
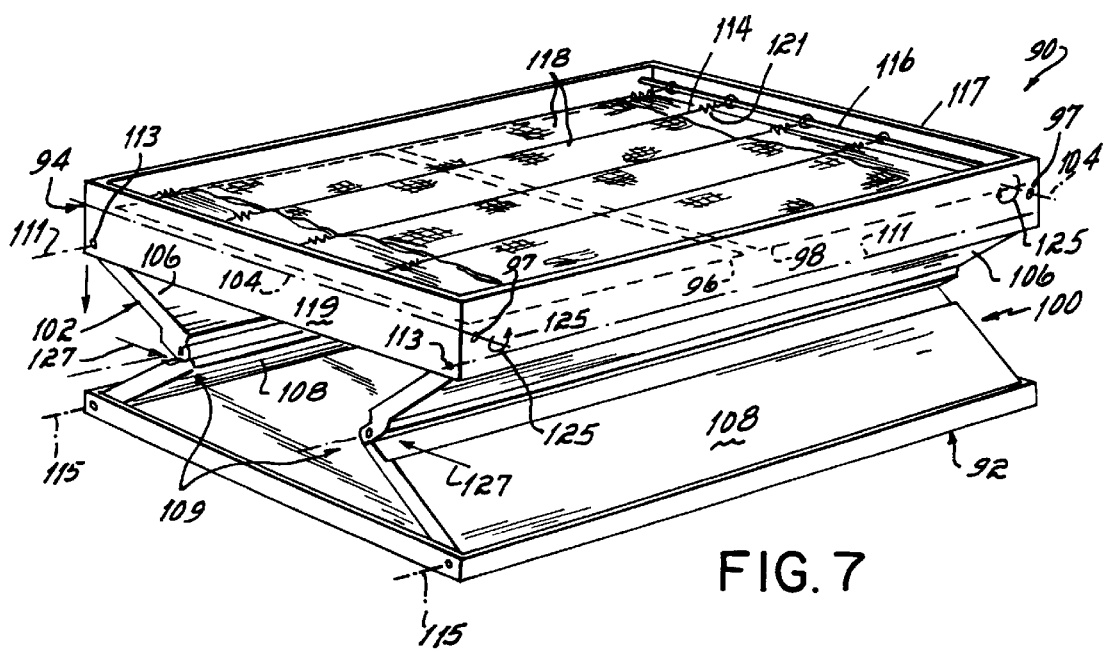
FIG. 7 is a perspective view of the container of FIG. 6 being collapsed with the dunnage therein in accordance with the principles of the present invention.

FIGS. 6 and 7 illustrate another embodiment of the container of the present invention which is formed as a tote box container or tote container capable of being manually handled and carried. The tote box container 90 of the invention comprises a generally flat base or bottom member 92 which is generally rectangular and forms a floor of the container 90 and a top member 94 which is also generally rectangular and is open so that product may be placed in and removed from the container. Pairs of opposing side walls 96, 98 and 100, 102 form the sides of container 90. The sides walls 96, 98 are hingedly coupled to the top member 94 to hinge or swing upwardly and downwardly with respect to the top member and around axis 104. For example, the side walls 96, 98 might be coupled to the top member 94 by pins (not shown) extending from side edges of the side walls 96, 98 to fit into hinge holes 97 formed in top member 94 so that the side walls pivot at their top edges with respect to the top member 94.

In the erected position as shown in FIG. 6, the side walls 96, 98 are swung downwardly away from the top member 94 to extend between the top member 94 and base member 92 generally perpendicular to the planes of both of these members. The other pair of opposing side walls 100, 102 include upper and lower sections 106, 108, respectively, which are coupled together at an intermediate hinge structure 109 so that the side walls 100, 102 may fold inwardly toward the center of container 90 when the container is collapsed (see FIG. 7). To that end, the side walls 100, 102 are hinged along their upper edge 1 10 to top member 94. Appropriate hinge structures (not shown) couple the side walls 100, 102 to the top member 94 so that the side walls 100, 102 hinge along an axis 111. For example, the side walls might include pins (not shown) which are received in hinge holes 113 in top member 94. The bottom edges 112 of the side walls 100, 102 are also hingedly attached to bottom member 92 by an appropriate hinging structure (not shown) so that the side walls 100, 102 hinge with respect to base member 92 along axis 115. The top edge 110 corresponds to the top edge of upper section 106, while the bottom edge 112 corresponds to the bottom edge of bottom section 108.

Tote container 90 includes collapsible and reusable dunnage similar to the dunnage included in the containers previously disclosed herein in accordance with the principles of the invention. That is, dunnage is positioned in the tote 90 and is movable between an engagement positioned and a collapsed position when the tote 90 is erected and collapsed, respectively. In one version, flexible support cables 114 span between rails 116 which are fixed to opposing ends 117, 119 of the top member 94. Alternatively, as illustrated in FIG. 1B, the cables 114 might be fixed directly to the top member 94 thus eliminating the rail elements 115. The rails 116 are fixed directly to the top member 94 or alternatively might be held thereto by supporting structures similar to structures 44 shown in FIG. 1. Furthermore, rails 116 may be rigid, or they may be flexible cables as illustrated in FIG. 1C. The cables 114 span between the ends 117, 119 of the top member 94 and provide support structures for pliable dunnage structures, such as dunnage pouches 118, suspended from the cables 114. The dunnage pouches 118 are similar to those already discussed. As discussed above, each cable preferably includes at least one tensioning element, such as spring 121, to provide proper tension on the cables 114 for proper support of the dunnage pouches when they contain product therein. Preferably, the dunnage pouches 118 are supported so that, when the container 90 is erected, they are suspended above the base member 92 of the container. The pouches 118 may also be fixed to the base member 92 to hold them in position when the container is shipped full of product.

When the tote container 90 of the invention is erected, top member 94 is raised above base member 92 and the side walls 100, 102 are folded outwardly from the center of the container. Preferably, the hinge structures 109 lock the side walls 100, 102 into an erected position such that the upper section 106 and bottom section 108 are generally coextensive with each other to form each side wall 100, 102. The other opposing side walls 96, 98 are then swung downwardly about axis 104 in the direction of arrow 123 to form a tote container 90 which is contained on all sides by solid side walls to protect products placed within the container 90 as illustrated in FIG. 6.

When the product shipped in tote container 90 has been emptied from the dunnage pouches 118, the tote container may be collapsed to a smaller size for return shipment to the manufacturer to be reused. Referring to FIG. 7, the tote container 90 is collapsed by first hinging or swinging the side walls 96, 98 upwardly along axis 104 and in the direction of arrow 125 to a generally horizontal position parallel to a plane defined by top member 94. In doing so, the pliable dunnage pouches 118 are pushed upwardly by the side walls 96, 98. The dunnage pouches are preferably formed of a resilient, pliable material as discussed hereinabove and will generally lie in a compressed or relaxed state on the top of collapsed side walls 96, 98 adjacent top member 94 as shown in FIG. 7.

Next, the side walls 100, 102 are hinged inwardly at hinge 109 in the direction of arrows 127 so that the side walls 100, 102 fold inwardly toward the center of the tote container 90 to be sandwiched between the top member 94 and base member 92. If the hinge structures 109 include a locking device (not shown) to keep the side walls 100, 102 erect, the locking device must be disengaged before collapsing the side walls. When the tote container 90 is collapsed, and the sides walls 100,102 fold, the top edges 110 of the side walls also hinge along axis line 111 with respect to the top member 94, and the lower edges 112 along the axis line 113 with respect to the base member 92. Referring to FIG. 7, the top member 94 is lowered against base member 92 and the folded side walls 100, 102 will lie between the top member 94 and bottom member 92 to form a collapsed tote container which has a shorter vertical height than the erected container. Preferably, the collapsed container has a height which is only approximately one-fourth (¼) of the height of the erected container to provide a four-to-one (4:1) return-to-shipment ratio. However, the container might be configured to collapse to a shorter size for a higher return-to-shipment ratio. Referring to FIG. 7, the height of collapsed container 90 will comprise the height of top member 94 along with the height of the bottom member 92, with dunnage pouches 118 resting on the collapsed side walls 96, 98 generally parallel to top member 94.

In accordance with the principles of the present invention, the dunnage is maintained within the tote container 90 and is moved into an engagement position simply by reversing the collapsing technique. That is, the top member 94 is lifted away from the base member 92 so that the side walls 100, 102 fold outwardly at hinge structures 109. Subsequently, the side walls 96, 98 swing downwardly to form the complete erected body of the container 90. When the side walls 96, 98 are moved to an erected position, the dunnage pouches 118 drop downwardly into the container to be suspended from the flexible support cables 114 in the engagement position, and are then configured to contain and protect product shipped or stored in the tote container. Alternatively, the pouches may be coupled directly to top member 94 as illustrated in FIG. 1D.

Figure 8:
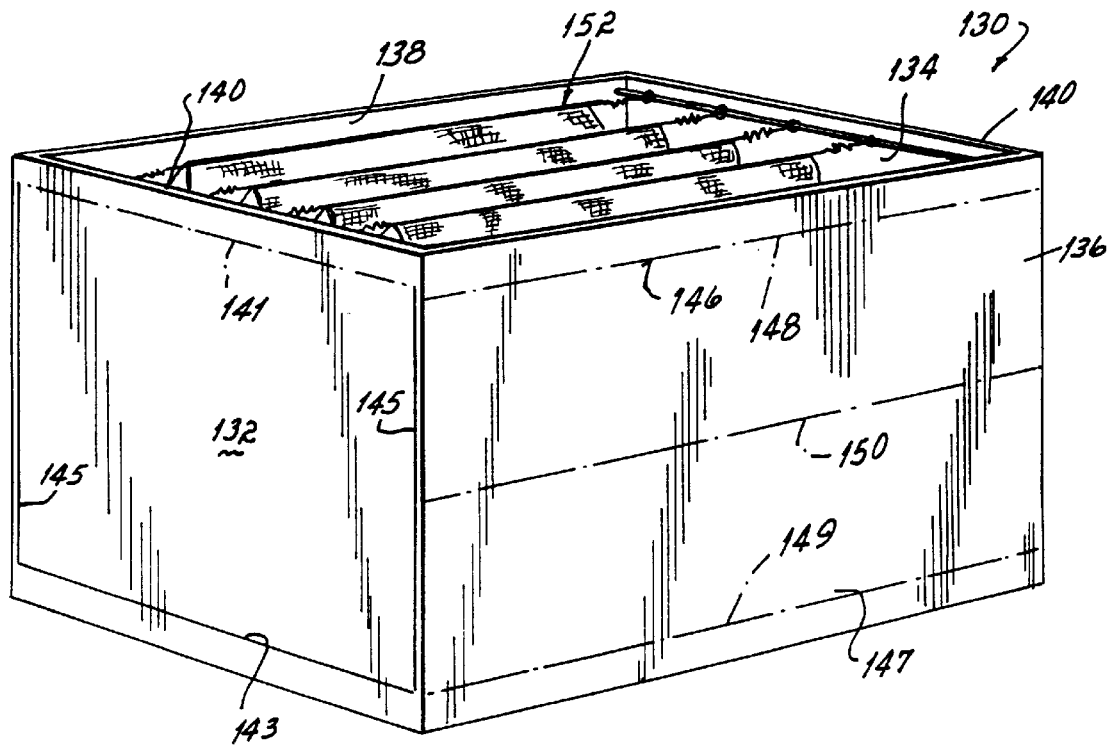
FIG. 8 is a perspective view of another alternative embodiment of the collapsible container with integrally supported dunnage of the present invention showing the container in an erected position.
Figure 9:
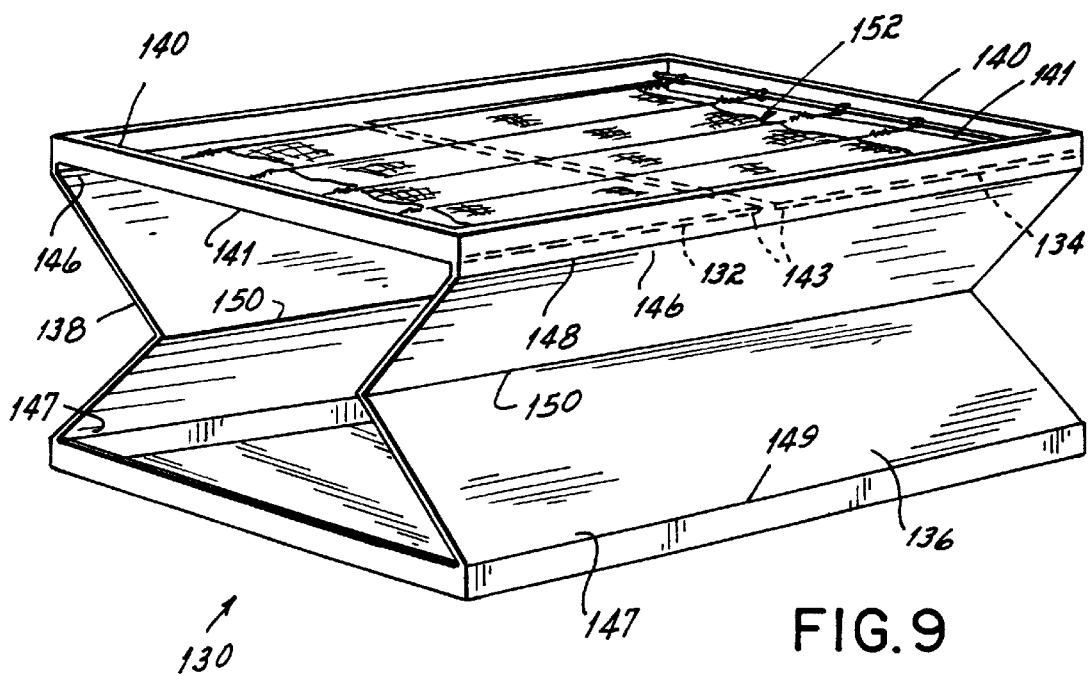
FIG. 9 is a perspective view of the container of FIG. 8 being collapsed with dunnage therein in accordance with the principles of the present invention.

FIGS. 8 and 9 illustrate another version of the tote container wherein tote 130 is formed preferably from a unitary blank so that the various side walls are integrally connected together. Tote 130 comprises a body with side walls 132, 134 and hingeable side walls 136, 138. The top edges 140 of the side walls 132, 134 are coupled to the tote body by a hinge or score line 141 to swing toward the top of the container to collapse the tote (FIG. 9). The bottom edge 143 and side edges 145 are free to allow movement of the side walls 132, 134 as described. The hingeable side walls 136, 138 are coupled to the tote container body at the top edge 146 and bottom edge 147 by hinge lines 148, 149, respectively. An intermediate hinge line 150 provides foldable hinging of the side walls 136, 138 as previously discussed. Tote container 130 includes dunnage structures 152 in accordance with the principles of the invention, which are attached to the tote container to operate with the container as previously described.

Referring to FIG. 9, the tote container collapsed with dunnage therein in a similar fashion as the embodiment of FIGS. 6 and 7 to form a collapsed tote container which is substantially smaller than an erected container. The version of the tote container 130 would be relatively simpler and cheaper to manufacture because of its integral construction. The tote container 130 might be die cut and scored as appropriate and may be made of a corrugated paperboard or corrugated plastic construction.

Figure 10:
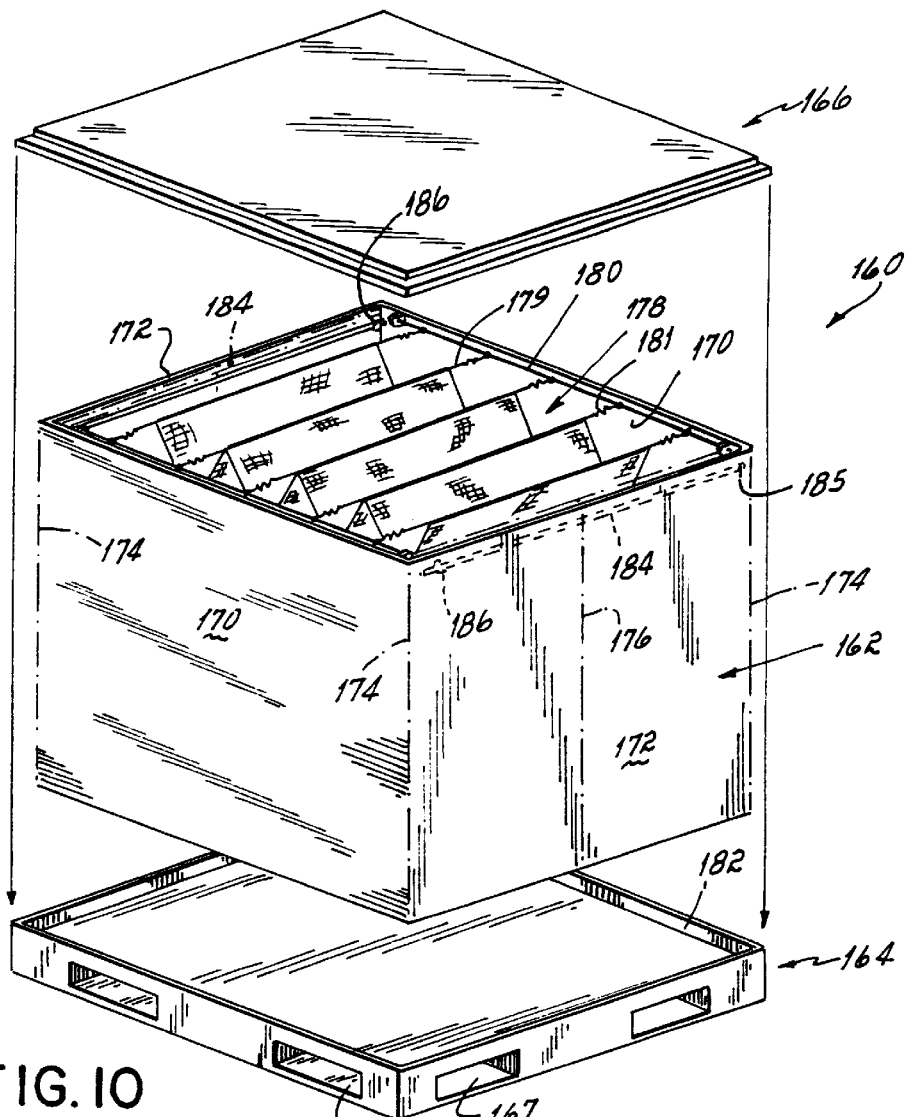
FIG. 10 is a perspective view of another alternative embodiment of the collapsible container with integrally supported dunnage of the present invention showing the container in an erected position; and, FIG. 11 is a perspective view of the container of FIG. 10 being collapsed with dunnage therein in accordance with the principles of the present invention.
Figure 11:
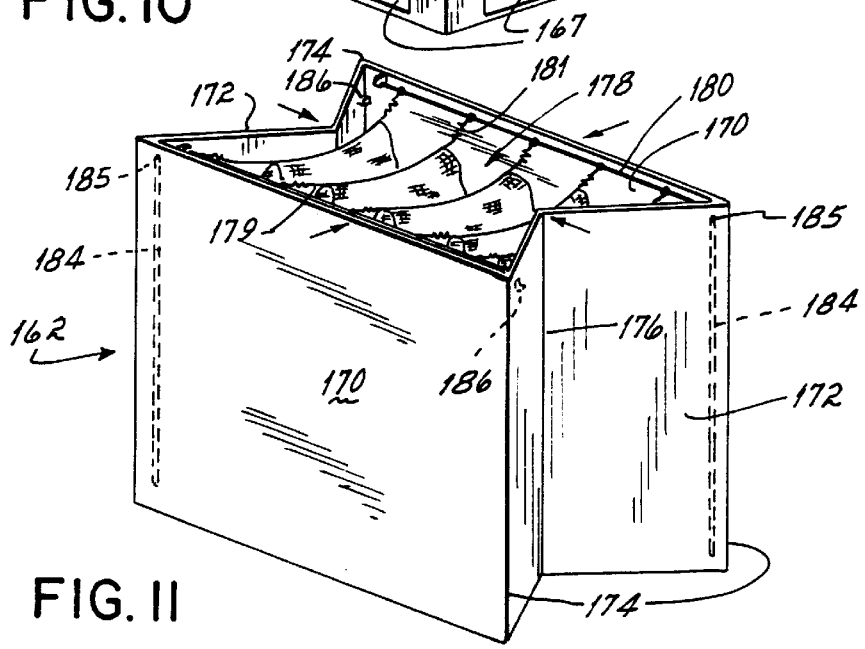

FIGS. 10 and 11 illustrate another alternative embodiment of the container in the invention. The container 160 of FIG. 10 is commonly referred to as a sleeve pack container and comprises a sleeve 162 which, when erected, fits into a pallet base 164 and is covered by a cover or top 166 to form a complete container. Pallet base 164 preferably has forklift openings 167 for handling container 160.

Sleeve 162 may be formed of a corrugated paperboard or corrugated plastic and has a plurality of vertical score lines or hinge lines formed therein. More particularly, the sleeve has opposing sets of side walls 170, 172. The side walls are hingedly connected at their side edges by hinge lines 174 for forming the sleeve 162. Alternatively, hinge structures (not shown) might be utilized as shown in patent application U.S. Ser. No. 08/412,141 entitled SLEEVE PACK ASSEMBLY which illustrates a sleeve pack design appropriate for practicing the invention, and which application is incorporated herein by reference in its entirety. Vertical hinge lines 176 are also formed intermediate the sides of side walls 172 for collapsing the side walls 172 as discussed below.

Sleeve 162 contains integral collapsible dunnage in accordance with the principles of the invention. To that end, sleeve 162 comprises a plurality of dunnage pouches 178 which, in one version, are suspended by flexible cables 179 coupled to rails 180 by tension elements 181. Alternatively, the pouches may be coupled directly to side walls 170 (see FIG. 1D). The pouches 178 are suspended in sleeve 162 to contain and protect product. Greater detail on the pouches is disclosed above.

Sleeve 162, when erected as shown in FIG. 10, fits into a peripheral groove 182 formed in pallet base 164. The groove 182 and rigidity of base 164 maintain the sleeve erect when the pouches are loaded with product. In an alternative version, a collapsible reinforcement bar or strip 184 might be utilized along the top edge of the collapsible side walls 172 (see FIG. 10). When container 160 is fully assembled, cover 166 is placed on the top of sleeve 162 to fully contain the products in pouches 178 to prepare them for shipment.

To collapse container 160, cover 166 is removed and the sleeve 162 is lifted from base 164. The side walls 172 are then folded inwardly along hinge lines 176 as shown in FIG.

11 to collapse the sleeve 162. In doing so, the reinforcement bar 184 must also be collapsed or moved out of the way as appropriate. When sleeve 162 is thus collapsed, the pouches 178 are held between the side walls 170 which are moved closer together to flatten the sleeve 162.

Referring to FIG. 11, the reinforcement bar 184 might be a rigid bar which does not fold or collapse. In such a case, the bar might be pivotally attached at one side 185 and may swing down to a vertical position as shown in FIG. 11 for collapsing sleeve 162. To erect the sleeve 162, the bar 184 is swung back into a horizontal position proximate the top edge of the sleeve and held in place by a clip 186 or other structure (see FIG. 10).

When sleeve 162 is collapsed, the dunnage pouches 179 collapse between side walls 170. The pliable pouches 178, and flexible cables 179, if utilized, allow the sleeve to fold down to a relatively thin shape for return shipment. The sleeves may then be stacked flat with the base and cover for a higher return ratio. The collapsed sleeve contains the dunnage therein when returned, and the dunnage will be constructed back into the engagement position when the sleeve is erected.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the dunnage structures used in the invention might be structures other than the pouches which would similarly be erected and collapsed when the container is erected and collapsed. The invention in its broader aspects is therefore limited only by the claims herein. Accordingly, departures may be made from the detailed description without departing from the spirit or scope of applicant's general inventive concept.

What is claimed is:

1. A reusable and returnable rack container for supporting a product thereon during shipment and subsequently being returned generally empty of product for reuse comprising:
    a frame having a top member, a bottom member and a plurality of legs extending therebetween, the legs configured for being movable between an erected position for spacing the top member above the bottom member to support a product placed on the rack and a collapsed position for collapsing and reducing the size of the rack container for return;
    the legs being hinged along their respective lengths for being folded into the collapsed position;
    a dunnage structure supported by the frame for receiving a product placed on the rack for shipment when the legs are in an erected position;
    the dunnage structure operable for relaxing when the legs are in a collapsed position such that the dunnage structure is generally positioned on the reduced size rack structure for return;
    the dunnage structure movably coupled to the frame and operable for being moved with respect to said erected frame to vary the position of the dunnage structure and the received product within the container;
    whereby the rack provides reusable dunnage which is usable with the container when it is shipped and subsequently remains with the container when it is returned for being reused when the container is again shipped.

2. The rack container of claim 1 further comprising a support structure coupled to the top member to span across the frame when the legs are in an erected position and support the dunnage structure.

3. The rack container of claim 2 wherein the dunnage structure is suspended from the support structure to hang down from the frame when the legs are in an erected position.

4. The rack container of claim 1 wherein the legs extend generally vertically between the top and bottom members, to space the top member above the bottom member.

5. The rack container of claim 1 wherein the dunnage structure is a pouch for holding the product.

6. The rack container of claim 5 wherein the pouch is pliable to relax when the legs are collapsed to fit within the reduced size rack.

7. The rack container of claim 1 further comprising a rail element coupled to the frame, the dunnage structure being coupled to the rail element.

8. The rack container of claim 7 wherein said dunnage structure is movably coupled to said rail element.

9. A reusable and returnable rack container for supporting a product thereon during shipment and subsequently being returned generally empty of product for reuse comprising:
    a frame having a top member, a bottom member and a plurality of legs extending therebetween, the legs configured for being movable between an erected position for spacing the top member above the bottom member to support a product placed on the rack and a collapsed position for collapsing and reducing the size of the rack container for return;
    the legs comprising telescoping sections operable to telescope the length of the leg between the erected and collapsed positions;
    a dunnage structure supported by the frame for receiving a product placed on the rack for shipment when the legs are in an erected position;
    the dunnage structure operable for relaxing when the legs are in a collapsed position such that the dunnage structure is generally positioned on the reduced size rack structure for return;
    the dunnage structure movably coupled to the frame and operable for being moved with respect to said erected frame to vary the position of the dunnage structure and the received product within the container;
    whereby the rack provides reusable dunnage which is usable with the container when it is shipped and subsequently remains with the container when it is returned for being reused when the container is again shipped.

10. The rack container of claim 9 further comprising a support structure coupled to the top member to span across the frame when the legs are in an erected position and support the dunnage structure.

11. The rack container of claim 10 wherein the dunnage structure is suspended from the support structure to hang down from the frame when the legs are in an erected position.

12. The rack container of claim 9 wherein the legs extend generally vertically between the top and bottom members, to space the top member above the bottom member.

13. The rack container of claim 9 wherein the dunnage structure is a pouch for holding the product.

14. The rack container of claim 13 wherein the pouch is pliable to relax when the legs are collapsed to fit within the reduced size rack.

15. The rack container of claim 9 further comprising a rail element coupled to the frame, the dunnage structure being coupled to the rail element.

16. The rack container of claim 15 wherein said dunnage structure is movably coupled to said rail element.

* * * * *

US006230916C1

(12) EX PARTE REEXAMINATION CERTIFICATE (8477th)

United States Patent
Bradford et al.

(10) Number: US 6,230,916 C1
(45) Certificate Issued: Aug. 23, 2011

(54) COLLAPSIBLE CONTAINER WITH INTEGRALLY SUPPORTED DUNNAGE

(76) Inventors: Judson A. Bradford, Holland, MI (US); Robert M. Zink, Grand Haven, MI (US)

Reexamination Request:
No. 90/011,141, Aug. 5, 2010

Reexamination Certificate for:
Patent No.: 6,230,916
Issued: May 15, 2001
Appl. No.: 09/532,580
Filed: Mar. 22, 2000

Related U.S. Application Data

(62) Division of application No. 09/033,680, filed on Mar. 3, 1998, now Pat. No. 6,062,410, which is a division of application No. 08/608,476, filed on Feb. 28, 1996, now Pat. No. 5,725,119.

(51) Int. Cl.
*B65D 81/00* (2006.01)

(52) U.S. Cl. .......................................... 220/6; 206/583
(58) Field of Classification Search ...................... 220/6
See application file for complete search history.

(56) References Cited

FOREIGN PATENT DOCUMENTS

| JP | H2-72045 | 3/1990 |
| JP | H6-59230 U | 8/1994 |
| WO | WO 93-10024 | 5/1993 |

OTHER PUBLICATIONS conTeyor Multibag Systems Brochure, publically distributed by conTeyor before Feb. 28, 1995 (the conTeyor Brochure). See the "Van Bree Decl." of Exhibit E.

*Primary Examiner* — William Doerrler

(57) ABSTRACT

A reusable and returnable container for holding product therein during shipment and subsequently being returned generally empty of product for reuse comprises a body configured for being manipulated into an erected position for containing a product placed therein during shipment and for subsequently being manipulated into a collapsed position for reducing the size of the container for return. An integrated dunnage structure is coupled to the body and is operable for moving into an engagement position when the container body is erected to thereby engage a product placed in the container for shipment. The dunnage structure is further operable for moving into a relaxed position when the container body is collapsed so that the container and dunnage structure may be returned together for reuse. The container provides reusable dunnage which is usable with the container when it is shipped and subsequently remains with the container when it is returned for being reused when the container is again shipped. In a preferred embodiment, pliable dunnage pouches are suspended in the container and collapse when the container is collapsed.

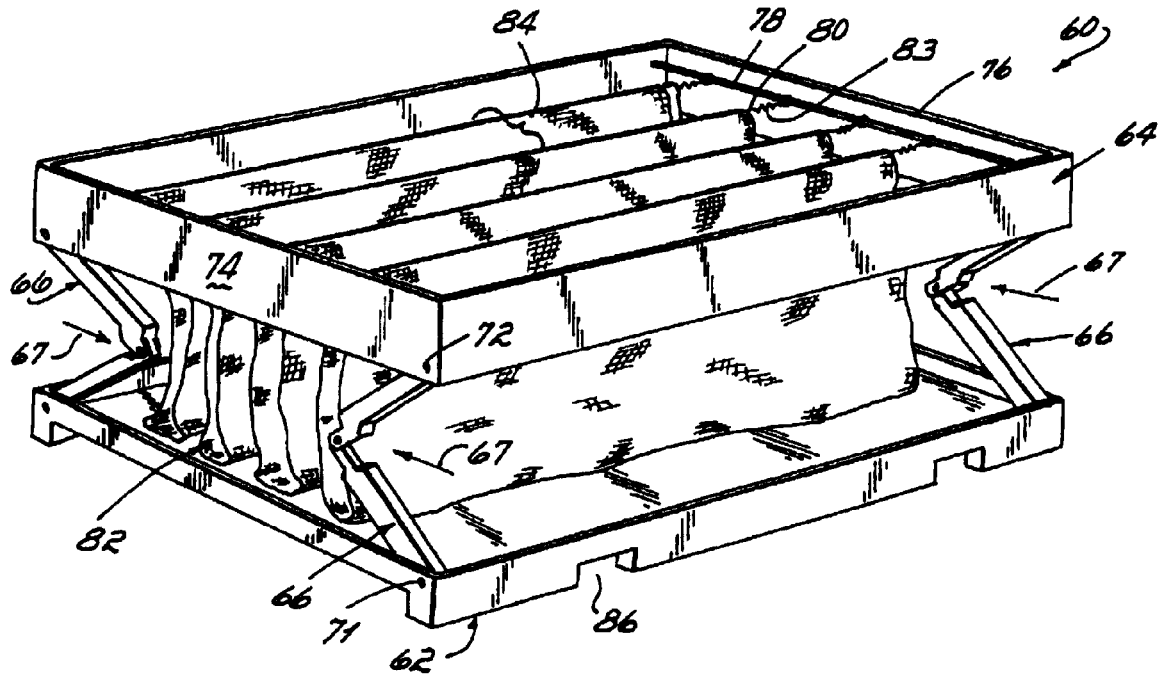

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

Claims 9-16 were not reexamined.

\* \* \* \* \*